US011023619B2

(12) United States Patent
Buendgen

(10) Patent No.: US 11,023,619 B2
(45) Date of Patent: Jun. 1, 2021

(54) BINDING A HARDWARE SECURITY MODULE (HSM) TO PROTECTED SOFTWARE

(71) Applicant: International Business Machines Corporation, Armonk, NY (US)

(72) Inventor: Reinhard T. Buendgen, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 16/131,322

(22) Filed: Sep. 14, 2018

(65) Prior Publication Data

US 2020/0089916 A1 Mar. 19, 2020

(51) Int. Cl.
*G06F 21/71* (2013.01)
*G06F 21/57* (2013.01)
(Continued)

(52) U.S. Cl.
CPC ............ *G06F 21/71* (2013.01); *G06F 21/572* (2013.01); *G06F 21/602* (2013.01); *G06F 21/604* (2013.01); *G06F 21/78* (2013.01); *H04L 9/30* (2013.01); *H04L 9/3271* (2013.01); *G06F 8/61* (2013.01)

(58) Field of Classification Search
USPC ........................................................ 713/189
See application file for complete search history.

(56) References Cited

U.S. PATENT DOCUMENTS

| 2011/0154501 A1* | 6/2011 | Banginwar | ........... H04L 9/3236 726/26 |
| 2013/0019105 A1* | 1/2013 | Hussain | ................... G06F 21/10 713/189 |

(Continued)

FOREIGN PATENT DOCUMENTS

WO 2018046670 A1 3/2018

OTHER PUBLICATIONS

Lauer et al., "Hypervisor-based Attestation of Virtual Environments", 2016 Intl IEEE Conferences on Ubiquitous Intelligence & Computing, Advanced and Trusted Computing, Scalable Computing and Communications, Cloud and Big Data Computing, Internet of People, and Smart World Congress pp. 333-340 (Year: 2016).*

(Continued)

*Primary Examiner* — Khalil Naghdali
(74) *Attorney, Agent, or Firm* — James L. Olsen

(57) ABSTRACT

Aspects of the present disclosure relate to binding a hardware security module to a software component. A secret can be cryptographically linked to the software component. The secret linked to the software component can be protected such that the secret is only accessible by a trusted firmware. The software component can then be installed in a secure software context. The protected secret can be transferred to the trusted firmware. A control block can be maintained by the trusted firmware in the secure software context, wherein the control block comprises the secret. The hardware security module can then be configured by the trusted firmware such that the hardware security module only responds to requests from a component having access to the secret.

12 Claims, 10 Drawing Sheets

(51) Int. Cl.
*G06F 21/60* (2013.01)
*G06F 21/78* (2013.01)
*H04L 9/32* (2006.01)
*H04L 9/30* (2006.01)
*G06F 8/61* (2018.01)

(56) References Cited

U.S. PATENT DOCUMENTS

| | | | |
|---|---|---|---|
| 2014/0006803 A1* | 1/2014 | Bodis | G06F 21/51 713/189 |
| 2015/0134953 A1 | 5/2015 | Seaborn et al. | |
| 2015/0358313 A1 | 12/2015 | Hussain et al. | |
| 2016/0164835 A1* | 6/2016 | Hoffmann | H04L 45/64 726/1 |
| 2017/0171219 A1* | 6/2017 | Campagna | H04L 9/0841 |
| 2017/0351879 A1 | 12/2017 | Sion | |
| 2018/0075259 A1 | 3/2018 | Manapragada et al. | |

OTHER PUBLICATIONS

Dou et al., "Robust Insider Attacks Countermeasure for Hadoop: Design and Implementation", IEEE Systems Journal, vol. 12, No. 2, Jun. 2018, pp. 1874-1885 (Year: 2018).*

Humphrey et al., "Security for Grids", 2005 IEEE, Proceedings of the IEEE, vol. 93, No. 3, Mar. 2005, pp. 644-652 (Year: 2005).*

Ogigau-Neamtiu, F., "Cryptographic Key Management in Cloud Computing", The 10th International Scientific Conference "Defense Resources Management in the 21st Century", Braşov, Nov. 13, 2015, 5 pages.

Mell et al., "The NIST Definition of Cloud Computing", Recommendations of the National Institute of Standards and Technology, Sep. 2011, 7 pages.

* cited by examiner

BINDING A HARDWARE SECURITY MODULE (HSM) TO PROTECTED SOFTWARE

BACKGROUND

The present disclosure relates generally to hardware security modules (HSMs), and in particular to binding HSMs to software.

Hardware security modules (HSMs) are physical computer devices which are used for security. HSMs typically manage digital keys and provide crypto-processing capabilities (e.g., onboard cryptographic key generation, key storage, key management, etc.). HSMs can have physical tamper proof and/or reactive features. This can ensure that the secrets (e.g., cryptographic data) stored on the HSM are well-protected.

SUMMARY

Embodiments of the present disclosure relate to a system, method, and computer program product for binding a hardware security module to a software component. A secret can be cryptographically linked to the software component. The secret linked to the software component can be protected such that the secret is only accessible by a trusted firmware. The software component can then be installed in a secure software context. The protected secret can be transferred to the trusted firmware. A control block can be maintained by the trusted firmware in the secure software context, wherein the control block comprises the secret. The hardware security module can then be configured by the trusted firmware such that the hardware security module only responds to requests from a component having access to the secret.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
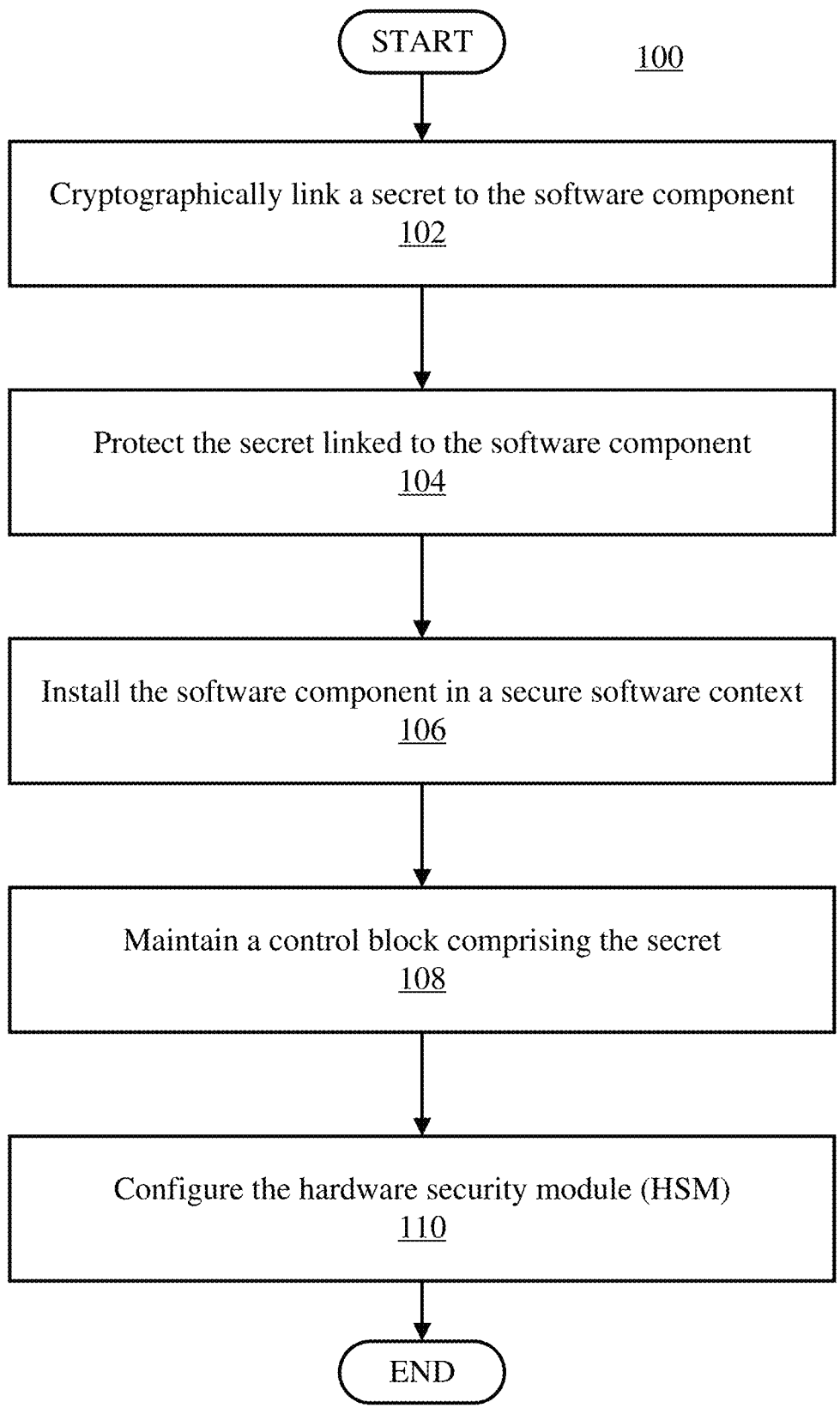
FIG. 1 is flow diagram illustrating a method for binding a software component to a hardware security module, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of HSMs, and in particular to binding HSMs to software. While the present disclosure is not necessarily limited to such applications, various aspects of the disclosure can be appreciated through a discussion of various examples using this context.

Trusted computing environments are essential key ingredients of today's cloud computing age. One of the characterizing factors of cloud computing is off-premise application deployment. Underlying hardware infrastructures are only then made available—and paid for—if there is a need to run a specific application. If the infrastructure capacities required for an application change (e.g., due to more or less workload), virtual machines can be moved from one hypervisor to another hypervisor, each being executed on different hardware. A clear 1:1 relationship between a dedicated hardware server and an application can no longer be guaranteed. On the other side, cloud computing providers and their customers need to ensure that the functionality of the application and access to the data may not be compromised.

To solve this problem, hardware security modules (HSMs) can be used. These can contain a secret key that may not be accessible by unauthorized parties. HSMs are tamper proof and designed to protect the secret key against unauthorized access (e.g., via unscheduled physical plugging, physical penetration, etc.). However, in a virtual environment, the HSM may not be aware of its reassignment from one virtual machine (VM) to another VM. In highly sensitive hosted information technology (IT) environments in which an owner of the hosted software does not trust system administrators of the hosting environment, the owner can desire to ensure that the secrets maintained by their HSM cannot be accessed by untrusted external software they do not own.

Thus, there is a need to efficiently bind an HSM to a specific instance of hosted software belonging to a particular owner of that software. Furthermore, there is a need to achieve this without the hosted software containing a secret required to bind the software to the HSM (e.g., such that no entities are able acquire the binding between the hosted software and the HSM).

In the context of this description, the following conventions, terms and/or expressions can be used:

The term 'software component' can denote an executable piece of software like an application and/or a virtual machine running on a hypervisor. However, software component can also refer to a specific software driver for accessing a dedicated hardware system. The software component can be of special interest and can be owned by one customer of a cloud computing provider. The owner of the software can have a specific interest that his software may not be compromised in the "foreign" environment of the cloud computing provider.

The term 'hardware security module' (HSM) can denote a hardware element being connected to or integrated into a computer system (e.g., a server). The HSM is designed to be tamper proof, and to protect a secret (e.g., a software key) against unauthorized access, even against physical penetration and/or unscheduled physical de-plugging. The HSM can be closely linked to a central processing unit (CPU) or can be operated independently of the CPU. In other words, an HSM is a physical computing device that safeguards and manages one or more digital keys for authentication and provides crypto-processing capabilities. These modules can come in the form of a plug-in card or an external device that attaches directly to a computer or network server.

The term 'cryptographically linking' can denote an establishment of a relation between two pieces of data such that the modification of either piece of data does break the link. Such links can be established using cryptographic signatures or message authentication codes (MACs) based on a secret key only known to parties trusted to have no interest in breaking the link.

The term 'secret' can denote a software code (e.g., a cryptographic key) used to establish a secure communication between the software component and an HSM. The secret can be integrated into a control block maintaining information about an installed software component.

'Protecting a secret' on its path from a source to a target relates to ensuring confidentiality and integrity of the secret. Unless secure hardware channels are available, such protection is established by setting up a secure channel based on cryptographic means such as, for example, asymmetric encryption, symmetric encryption, signatures, and/or message authentication codes.

The term 'trusted firmware' can denote software that can be deeply linked to hardware components for which users can be sure that the trusted firmware will only be delivered by one specific trusted vendor and not accessible by any software that can be freely deployed by a customer of that hardware.

The term 'secure software context' can denote a real or virtual memory space of an OS (operating system) and/or one or more applications. Such a memory space can be protected by the hypervisor. Different implementations of such secure software contexts can exist from different vendors; they can be referred to as enclaves, secure containers, or secure virtual machines.

The term 'control block' can denote a data structure comprising control information about an installed software. It can comprise information about hardware (real or virtual) and/or I/O channels to be used for the installed software component. The control block can also comprise other information like the secret and/or compute priority information.

The term 'protocol'—in particular, a communication protocol—can denote a system of rules that can allow two or more entities of a system to transmit information via any kind of variation of a physical quantity. The protocol can define the syntax, semantics and synchronization of the communication and possible error recovery methods. Protocols can be implemented by hardware, software, or a combination of both. In some embodiments, the trusted firmware is instrumental for the functioning of the protocol.

It should be noted that cloud software takes full advantage of the cloud paradigm by being service-oriented with a focus on statelessness, low coupling, modularity, and semantic interoperability.

The proposed computer-implemented method for binding a software component to a hardware security module can offer multiple advantages and technical effects.

Aspects can guarantee an unbreakable binding between an HSM and a specific software component to be deployed in a cloud computing environment operated by a third party with "untrusted" system administrators. The binding between the HSM and the specific software application can be based on a secret which cannot be stolen.

If it is assumed that the HSM represents a trusted environment to which the secret is bound initially, aspects can only respond to requests of issuers of requests that can prove to know the original secret linked to the software component.

In case the software component is a virtual machine, aspects can ensure that protection exists against modified, malicious hypervisors and/or other compromising hardware/software combinations.

For users, the complete process can be transparent. The owner of the software operating on leased hardware/operating system/hypervisor environments can keep complete control over the binding of the software to a specific processor (e.g., an HSM). Due to a physical direct connection between a specific processor and a specific HSM, it can be ensured that the software application itself as well as related application data become un-attackable.

It can be assumed that the secret will be shipped to the trusted firmware in a data set separated from code of the software component. In particular, the secret need not be part of the software component. Therefore, the secret and the binding to the HSM cannot be stolen by an attacker who intrudes the running software component.

In the following, additional embodiments of the method—also applicable to the related system—will be described:

According to some embodiments, aspects can comprise intercepting each request to the hardware security module—in particular to a configured hardware security module—by the trusted firmware. This can ensure that only allowed requests to the hardware security module can be passed through or managed by the trusted firmware. Other requests can simply be blocked by the trusted firmware.

According to some embodiments, aspects can also comprise re-submitting, by the trusted firmware, each intercepted request from the secure software context to the hardware security module using a protocol requiring that the sender of the intercepted request has access to the secret. This can be linked to the software component running in the secure software context. Thus, compromising the software component to hardware security module pairing can become practically impossible.

According to some embodiments, aspects can also comprise returning a result of the request by the hardware security module to the trusted firmware if the request was received using the protocol (i.e., the "protocol" abstracting from both options on how to proof the knowledge of the secret) that requires the sender to have access to the secret, and otherwise, returning an error indication. Thus, unauthorized requests may not be answered.

According to some embodiments, aspects can also comprise forwarding the result of the request by the trusted firmware to the software component being executed in the secure software context. This way, the communication loop is closed: from the software component via the trusted firmware to the hardware security module, back to the trusted firmware and again back to the software component.

According to some embodiments, aspects can be a challenge response protocol, where each request can request a challenge or comprise a response to a challenge from the hardware security module that can only be solved using the secret. Thus, only the trusted firmware should be able to maintain such a protocol-based communication. The challenge to be solved can be explicitly requested from the hardware security module or be part of the response to the previous request.

According to some embodiments, aspects can comprise that the trusted firmware establishes a session to the hardware security module comprising authenticating the opening of the session using the secret, re-submitting to the hardware security module only requests intercepted from the secure software context, and/or closing the session. Thus, states of a state diagram can define a closed group.

According to some embodiments, the hardware security module can only respond to requests inside an open session or a request for a challenge or a request to open a session authenticated with the secret or a request to zero-ize the hardware security module. Other requests will be ignored, further enhancing the security. The term 'zero-ize' can be understood as the act of deleting all state information including sessions, configurations and other data of the hardware security module without revealing any secrets stored in the hardware security module.

According to some embodiments, all open sessions on the hardware security module can be closed if the system is stopped or booted or when the hardware security module is removed from the system. Hence, an open session cannot be compromised due to hardware or system manipulations. Breaking into a system using the proposed method becomes practically impossible.

According to some embodiments, the secret can be a symmetric key which can be used for the configuration of the hardware security module, or the secret can be a public/private key pair—in particular, potentially cryptographically bound to the secret in installation data of the software component—of which the public key is used for the configuration of the hardware security module, in particular by the trusted firmware. Hence, the here proposed concept is open to the different implementation approaches using different types of key mechanisms.

FIG. 1 is a follow diagram illustrating a method 100 for binding a software component (e.g., a VM or an application) to a hardware security module (HSM). The method 100 initiates at operation 102, where a secret is cryptographically linked to the software component. This can be completed using cryptographic signatures, MACs (message authentication code), and the like. The secret is then protected. This is illustrated at operation 104. The secret is protected by ensuring the secret is only accessible to a trusted firmware.

The method 100 further comprises installing the software component in a secure software context and transferring the protected secret to the trusted firmware. This is illustrated at operation 106. The secure software context can be a protected memory space (e.g., real or virtual memory). The trusted firmware can register the protected memory space. In some embodiments, the secure software context is a process running in an OS or a virtual machine running in a hypervisor.

A control block comprising the secret is then maintained. This is illustrated at operation 108. The control block can be a data structure maintained by the trusted firmware for executing the software component in the software context. The HSM is then configured by the trusted firmware. This is illustrated at operation 110. The HSM can be configured such that it only responds to requests from components having access to the secret.

The aforementioned operations can be completed in any order and are not limited to those described. Additionally, some, all, or none of the aforementioned operations can be completed, while still remaining within the spirit and scope of the present disclosure.

Figure 2:
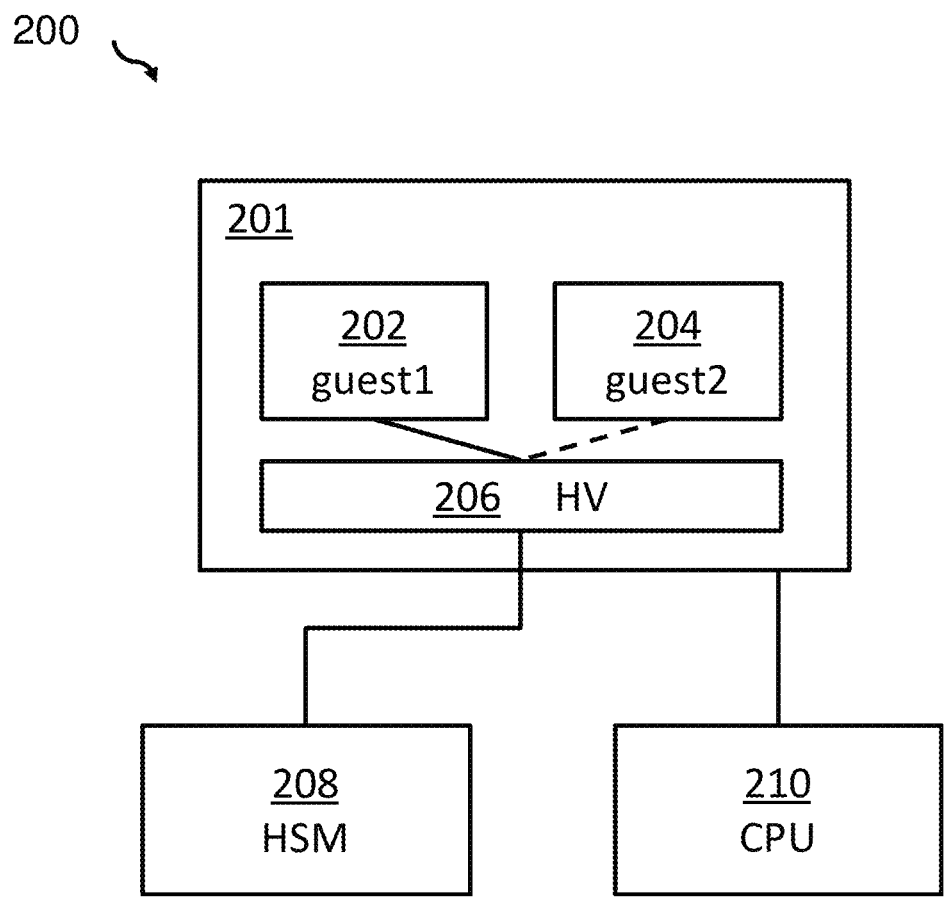
FIG. 2 is a block diagram illustrating a computing environment in which illustrative embodiments of the present disclosure can be implemented.

FIG. 2 is a block diagram illustrating a computing environment 200 in which illustrative embodiments of the present disclosure can be implemented. A hardware security module (HSM) 208 is communicatively coupled (e.g., via a network, wired connection, etc.) to a CPU 210 and can comprise one or more secrets (e.g., cryptographic keys). Each key can be bound to one or more software components, for example, during an installation process of the software component.

In memory 201 of a related server (not shown), a hypervisor 206 is installed to function as a basis for operating a plurality of guests. As depicted in FIG. 2, a first guest 202 and a second guest 204 are deployed on the hypervisor 206. In embodiments, the first and second guests 202 and 204 can be virtual machines having their own operating system and applications. The virtual machines 202 and 204 along with any applications can be designated, in accordance with aspects of the present disclosure, as software components. In some environments (e.g., Docker, server-less computing, etc.), the software components can be container-based services.

It is noted that FIG. 2 is intended to depict the representative major components of an exemplary computing environment. In some embodiments, however, individual components can have greater or lesser complexity than as represented in FIG. 2, components other than or in addition to those shown in FIG. 2 can be present, and the number, type, and configuration of such components can vary.

Figure 3:
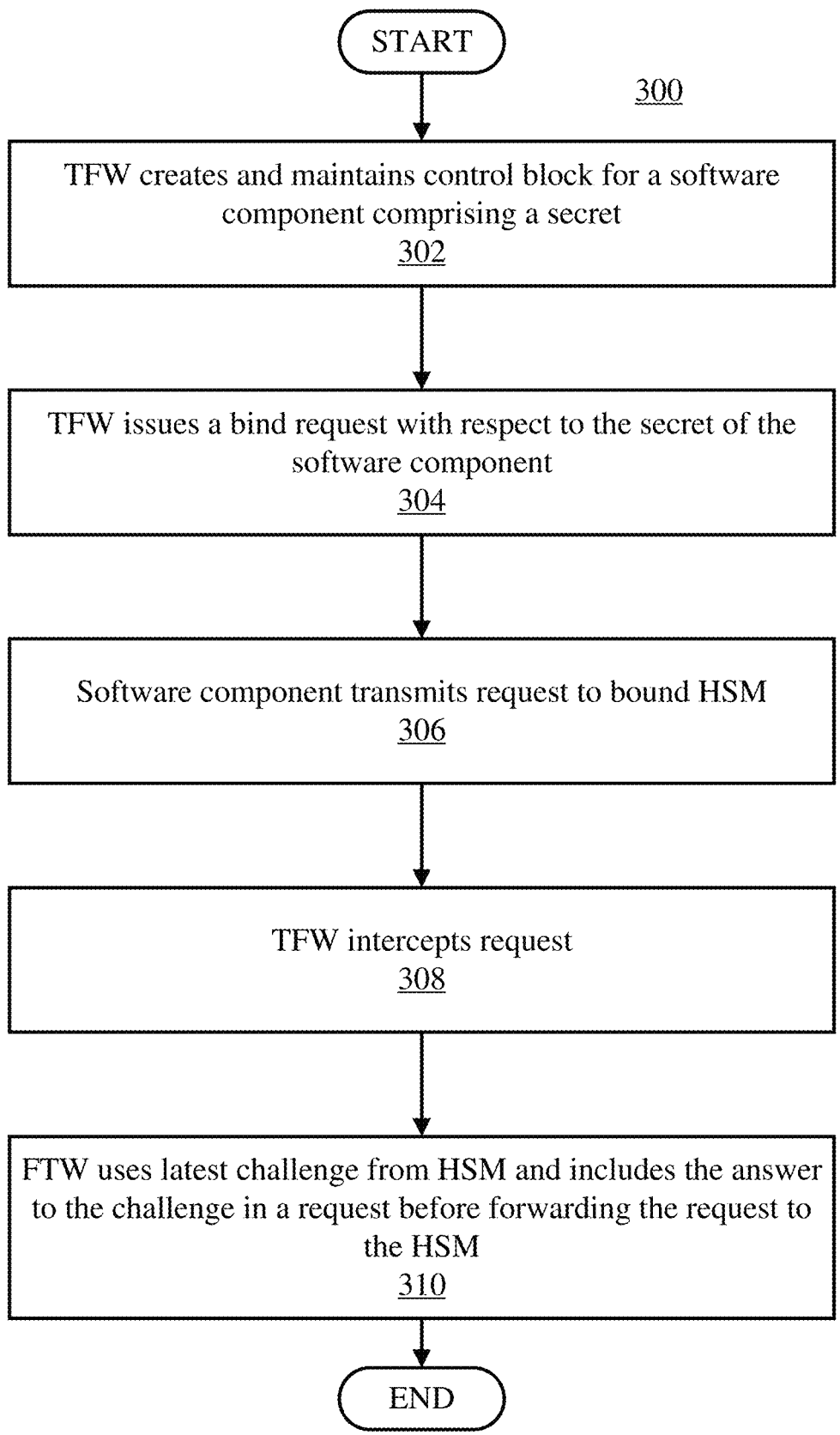
FIG. 3 is a flow diagram illustrating a method for binding a software component to a hardware security module, in accordance with embodiments of the present disclosure.

FIG. 3 is a flow diagram illustrating a method 300 for binding an HSM to a software, in accordance with embodiments of the present disclosure. When starting a software component (e.g., hosted software) with a defined HSM, the trusted firmware (TFW) creates and maintains a control block for the execution environment of the software component. This is illustrated at operation 302. The control block includes the secret of the installed software component. Thereafter, the trusted firmware issues a bind request with respect to the secret of the software component. This is illustrated at operation 304. The bind request can (if accepted) configure the HSM to be bound to the software component.

The software component then sends a request to its assigned (e.g., bound) HSM. This is illustrated at operation 306. The trusted firmware then intercepts the request. This is illustrated at operation 308. The trusted firmware then uses the latest challenge (e.g., security challenge) from the HSM and includes the answer (e.g., password) to the challenge in a request before forwarding the request to the HSM. This is illustrated at operation 310. The answer to the challenge is based on the secret from the software component (e.g., the hosted software component).

The aforementioned operations can be completed in any order and are not limited to those described. Additionally, some, all, or none of the aforementioned operations can be completed, while still remaining within the spirit and scope of the present disclosure.

Figure 4:
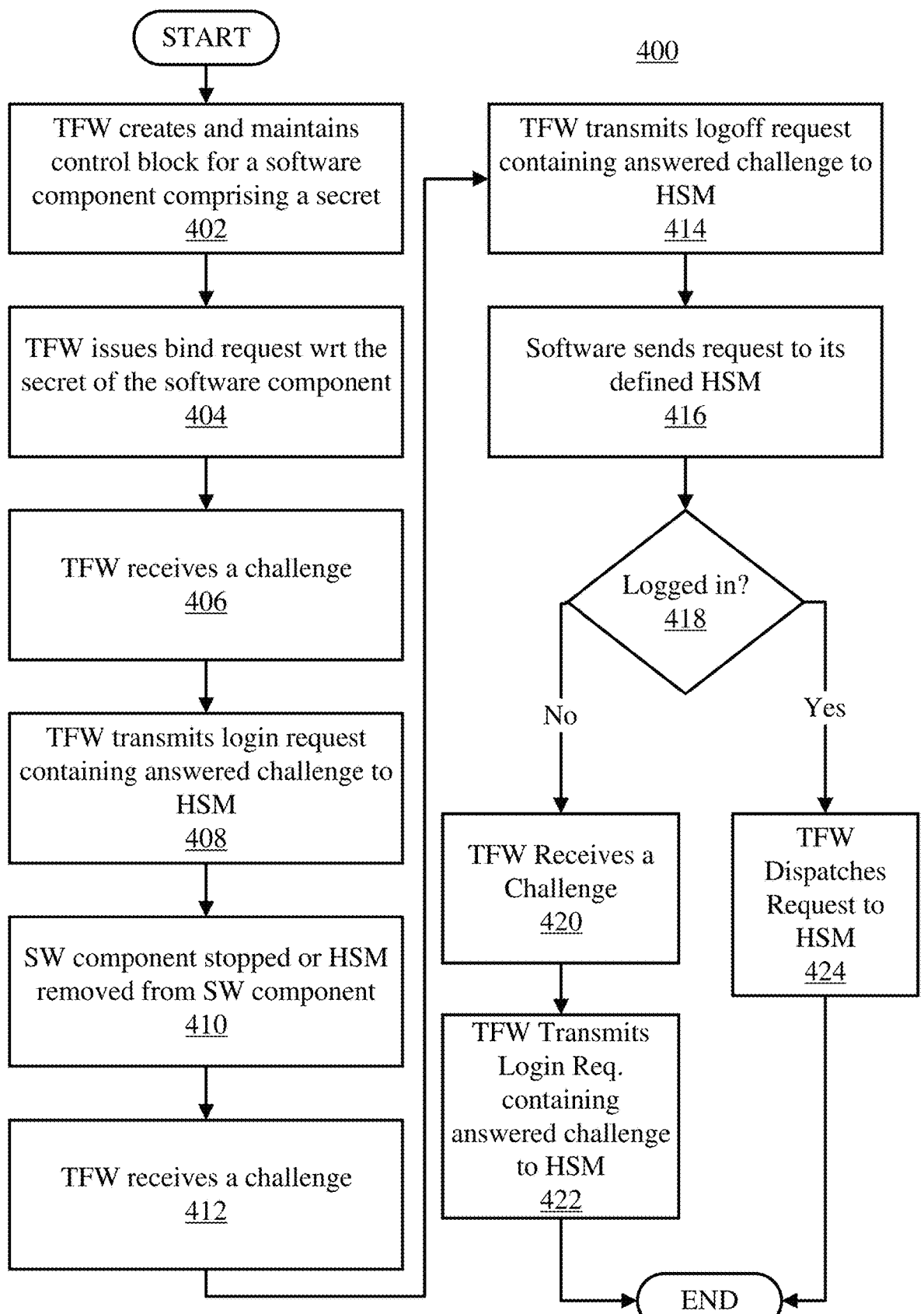
FIG. 4 is a flow diagram illustrating another method for binding a software component to a hardware security module, in accordance with embodiments of the present disclosure.

FIG. 4 is a flow diagram illustrating a method 400 for binding an HSM to software, in accordance with embodiments of the present disclosure. Method 400 initiates where trusted firmware creates and maintains a control block for a software component (e.g., hosted software, a VM, etc.) comprising a secret. This is illustrated at operation 402. Thereby, the control block comprises the secret to the hosted guest (e.g., the execution environment of the software component). The trusted firmware then issues a bind request to the hardware security module with respect to the secret linked to the software component. This is illustrated at operation 404. This configures the hardware security module to be bound to the software component. The trusted firmware receives a challenge (e.g., as part of a return code of the bind request or upon request). This is illustrated at operation 406. The trusted firmware transmits a login request comprising the answered challenge to the HSM. This is illustrated at operation 408. This can open a session between the trusted firmware and the hardware security module.

The software component is then either stopped (e.g., closed, terminated, etc.) or the HSM is removed (e.g., decoupled) from the software component. This is illustrated at operation 410. When the software component is stopped or the HSM is configured off the software component, the trusted firmware can receive a challenge (e.g., as a part of the last return code or upon request). This is illustrated at operation 412. The trusted firmware then can transmit a logoff request to the HSM to close an open session. This is illustrated at operation 414. The logoff request can contain the answered challenge.

The TFW then transmits a request to its defined HSM, the trusted firmware intercepts this request. This is illustrated at operation 416. A determination is then made whether the trusted firmware has established an open session (e.g., logged in) using the secret linked to the software component. This is illustrated at operation 418. If the trusted firmware has not established an open session using the secret linked to the software component (e.g., "No" at operation 418), the trusted firmware receives (e.g., as part of a return code or upon request) a challenge. This is illustrated at operation 420. The trusted firmware then transmits a login request comprising the answered challenge to the HSM. This is illustrated at operation 422. In case the trusted firmware has established an open session using the secret linked to the software component (e.g., "Yes" at operation 418) the trusted firmware dispatches the request to the HSM. This is illustrated at operation 424.

The aforementioned operations can be completed in any order and are not limited to those described. Additionally, some, all, or none of the aforementioned operations can be completed, while still remaining within the spirit and scope of the present disclosure. For example, in some embodiments, operations 412-414 can be optionally completed.

Figure 5:
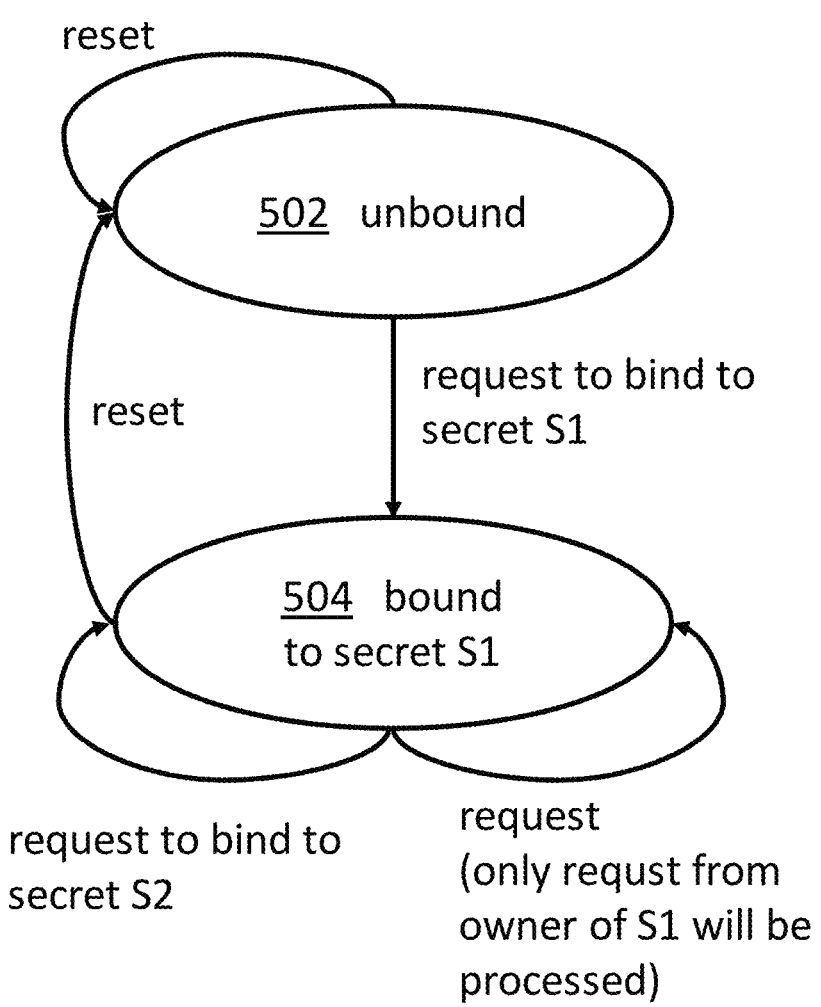
FIG. 5 is a state diagram illustrating an unbound state and a bound state between a hardware security module and a software component, in accordance with embodiments of the present disclosure.

FIG. 5 is a state diagram 500 including a bound state and an unbound state of an HSM, in accordance with embodiments of the present disclosure. The state diagram 500 can be substantially similar to the method 300 depicted in FIG. 3. In its ground state, the HSM is an unbound status 502. It can also be forced into this unbound status by a reset (e.g., "zero-ize"). Upon a configuration request to bind the secret S1, the HSM status transitions to the "bound to secret S1" status 504. The HSM remains in this status if requests—in particular request from the owner of this secret S1—will be processed. Upon the request to bind to secret S2, the HSM will continue to remain in the status "bound to secret S1".

A reset request will bring the status of the HSM back to the unbound status 502 from which it can transition—by a respective request—to a binding to another secret (e.g., secret S2).

Figure 6:
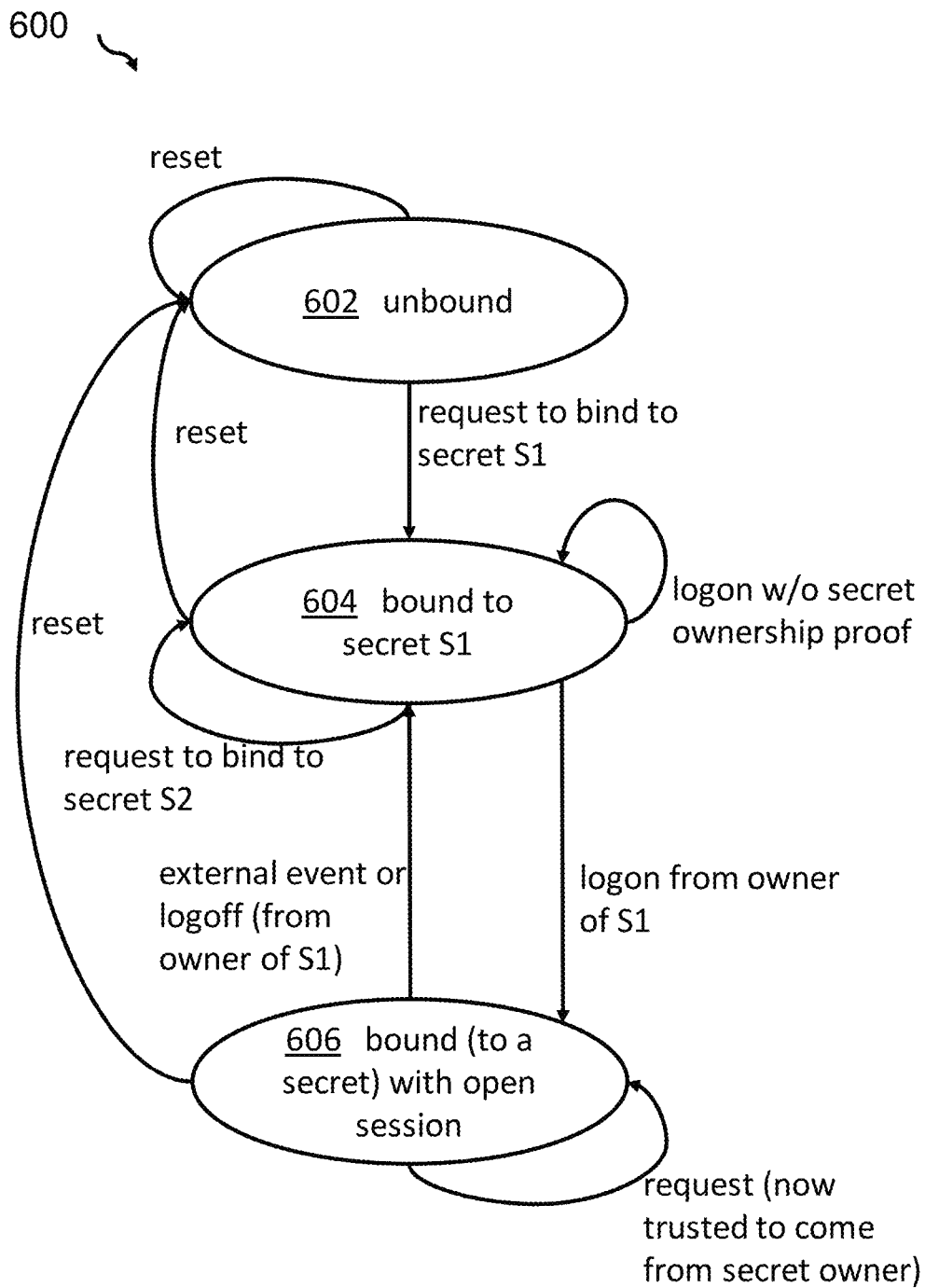
FIG. 6 is a state diagram illustrating an unbound state and a bound state between a hardware security module and a software component, in accordance with embodiments of the present disclosure.

FIG. 6 is a state diagram 600 including a bound and an unbound state of an HSM, in accordance with embodiments of the present disclosure. The state diagram 600 can be substantially similar to the method 400 depicted in FIG. 4. Per default, the HSM is in the status unbound 602. Upon a request to bind to secret S1, the HSM transitions into the status "bound to secret S1" 604. A login attempt without a secret S1 ownership proof will not change the status 604 of the HSM. If, however, a log-in attempt from the owner of the secret S1 reaches the HSM, the HSM transitions to the status "bound with open session" 606. A request reaching the HSM will now not change the status of the HSM because it is trusted that the request comes from the secret owner.

If the HSM is in the status "bound to S1" 604, requests to bind to other secrets (e.g., secret S2) will not change the status 604 of the HSM. A reset request to the HSM being in status 606 "bound with open session" or status "bound to S1" 604 will return the status of the HSM to the unbound status 602. A transition to the status "bound to secret S1" 604 will also occur if the HSM having the status "bound with open session" 606 receives a logoff off request.

Figure 7:
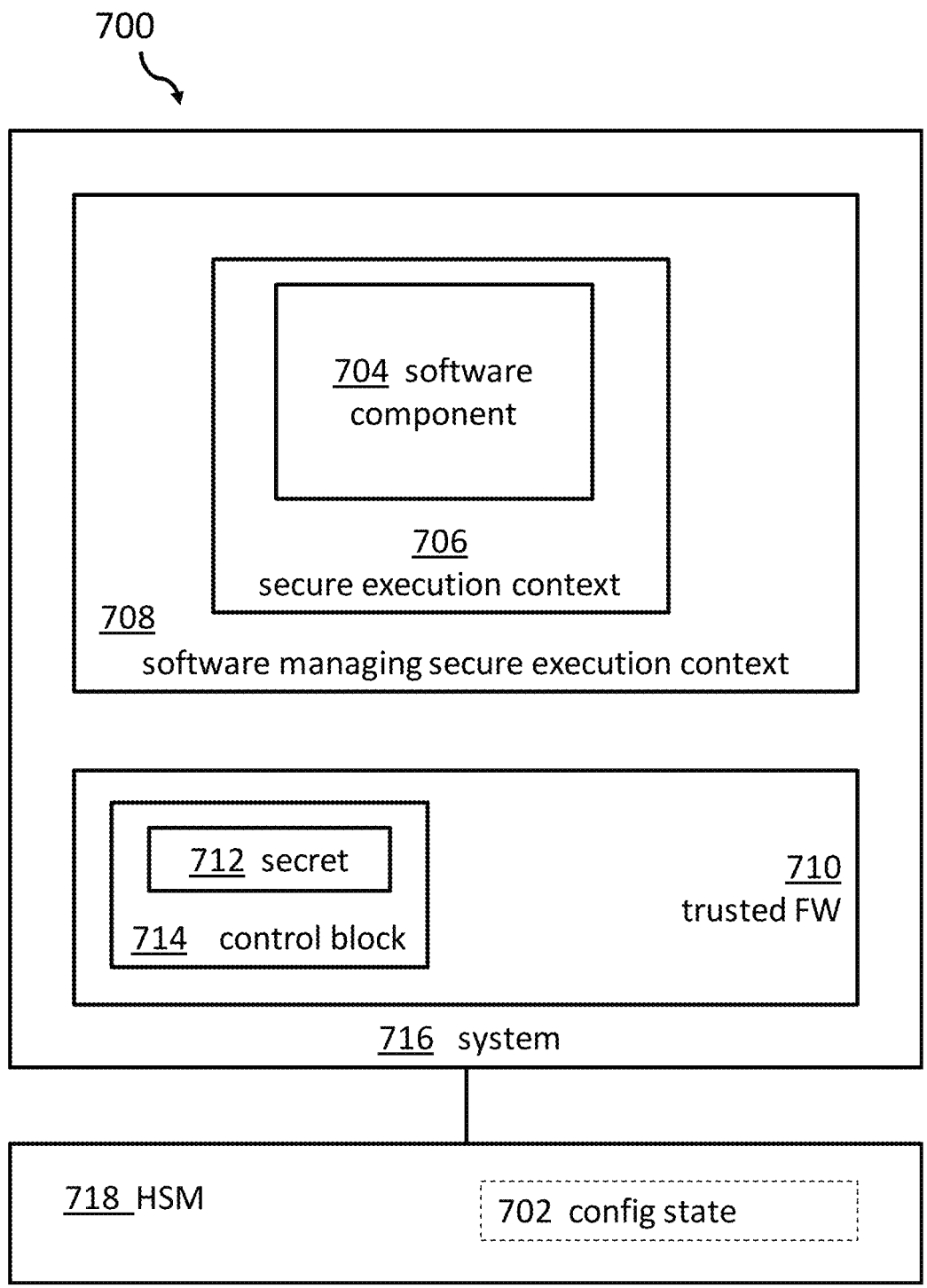
FIG. 7 is a block diagram illustrating a computing environment in which illustrative embodiments of the present disclosure can be implemented.

FIG. 7 is a block diagram illustrating a computer system 700 in which illustrative embodiments of the present disclosure can be implemented. All active and passive components instrumental for the proposed method and system are shown in a single context. An HSM 718 (e.g., HSM 208 of FIG. 2) is shown to be in a configured state 702 (e.g., bound to a secret 712).

The software component 704 is shown to be placed/running in a secure execution context 706 and a software environment 708 (e.g., operating system or hypervisor) managing the secure execution context 706.

In parallel to the software environment 708, trusted firmware 710 is shown to be part of the computer system 716 (here, excluding the HSM 718, which can be implemented as a slot-connectable module). As part of the trusted firmware 710, the secret 712 is stored in the control block 714 for the secure execution context 706.

It is noted that FIG. 7 is intended to depict the representative major components of an exemplary computing environment. In some embodiments, however, individual components can have greater or lesser complexity than as represented in FIG. 7, components other than or in addition to those shown in FIG. 7 can be present, and the number, type, and configuration of such components can vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
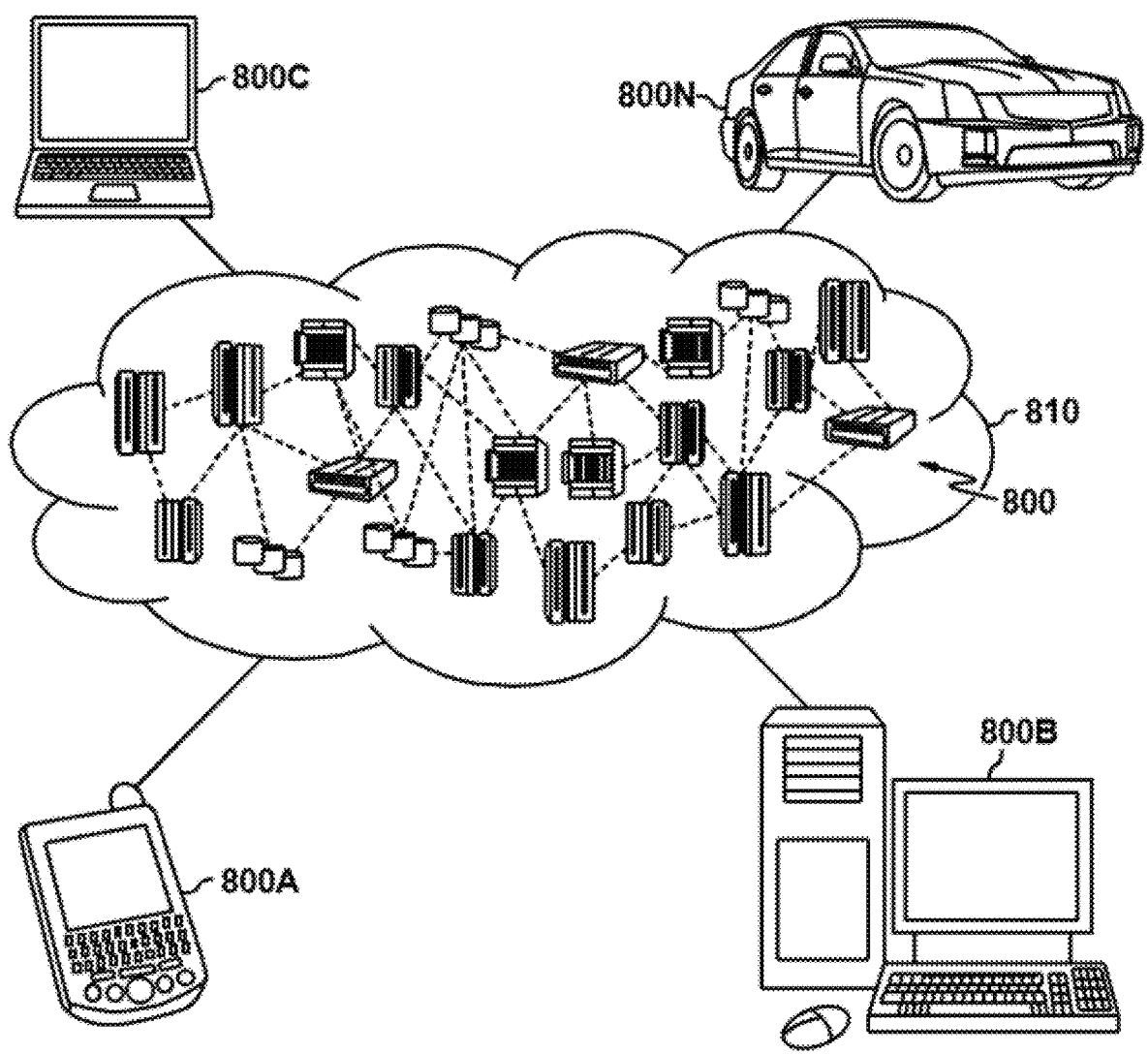
FIG. 8 is a diagram illustrating a cloud computing environment, in accordance with embodiments of the present disclosure.

Referring now to FIG. 8, illustrative cloud computing environment 810 is depicted. As shown, cloud computing environment 810 includes one or more cloud computing nodes 800 with which local computing devices used by cloud consumers, such as, for example, personal digital assistant (PDA) or cellular telephone 800A, desktop computer 800B (e.g., computer system 700) laptop computer 800C, and/or automobile computer system 800N can communicate. Nodes 800 can communicate with one another. They can be grouped (not shown) physically or virtually, in one or more networks, such as Private, Community, Public, or Hybrid clouds as described hereinabove, or a combination thereof. This allows cloud computing environment 810 to offer infrastructure, platforms and/or software as services for which a cloud consumer does not need to maintain resources on a local computing device. It is understood that the types of computing devices 800A-N shown in FIG. 8 are intended to be illustrative only and that computing nodes 800 and cloud computing environment 810 can communicate with any type of computerized device over any type of network and/or network addressable connection (e.g., using a web browser).

Figure 9:
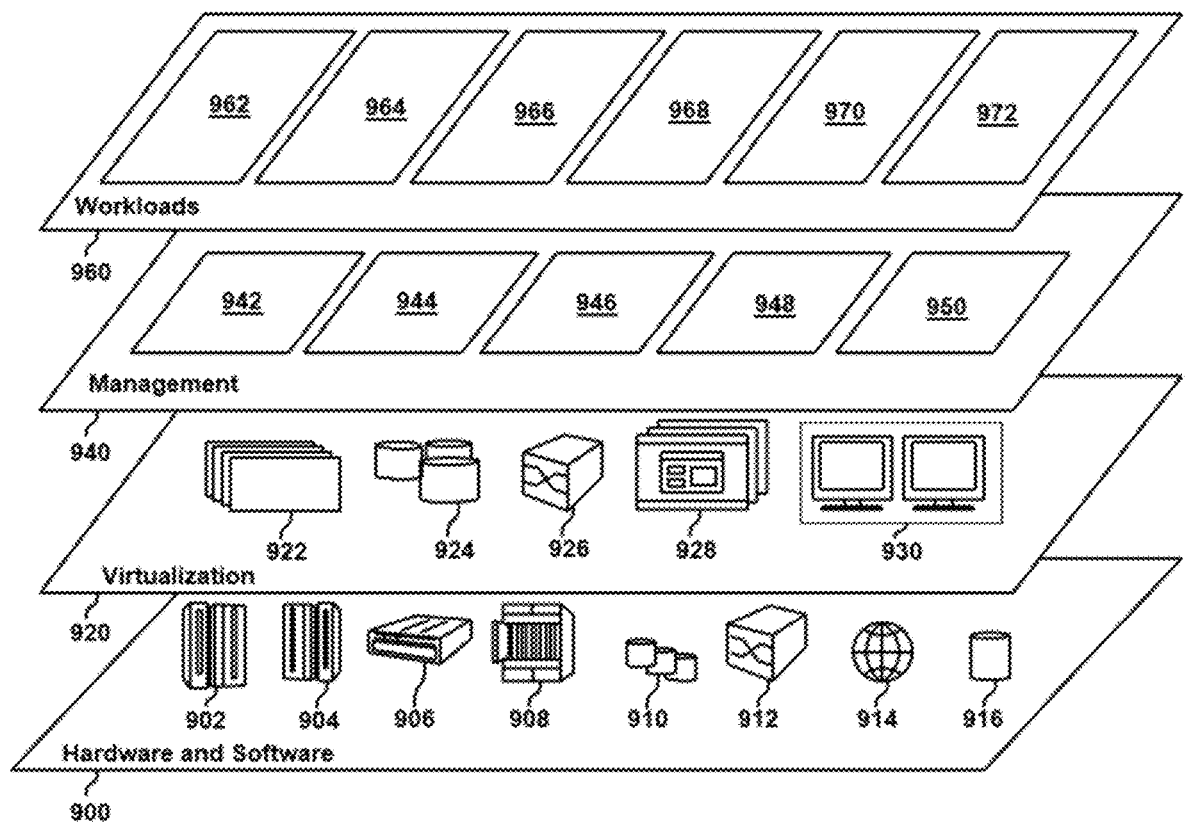
FIG. 9 is a block diagram illustrating abstraction model layers, in accordance with embodiments of the present disclosure.

Referring now to FIG. 9, a set of functional abstraction layers provided by cloud computing environment 810 (FIG. 8) is shown. It should be understood in advance that the components, layers, and functions shown in FIG. 9 are intended to be illustrative only and embodiments of the disclosure are not limited thereto. As depicted below, the following layers and corresponding functions are provided.

Hardware and software layer 900 includes hardware and software components. Examples of hardware components include: mainframes 902; RISC (Reduced Instruction Set Computer) architecture based servers 904; servers 906; blade servers 908; storage devices 910; and networks and networking components 912. In some embodiments, software components include network application server software 914 and database software 916.

Virtualization layer 920 provides an abstraction layer from which the following examples of virtual entities can be provided: virtual servers 922; virtual storage 924; virtual networks 926, including virtual private networks; virtual applications and operating systems 928; and virtual clients 930.

In one example, management layer 940 can provide the functions described below. Resource provisioning 942 provides dynamic procurement of computing resources and other resources that are utilized to perform tasks within the cloud computing environment. For example, resource provisioning 942 can allocate additional computing resources to devices which are indicated to have high activity. Metering and Pricing 944 provide cost tracking as resources are utilized within the cloud computing environment, and billing or invoicing for consumption of these resources. In one example, these resources can include application software licenses. In some embodiments, Metering and Pricing 944 indicates the number of allotted licenses to machines (e.g., HSM 208, computer system 700, HSM 718) in the system. Security provides identity verification for cloud consumers and tasks, as well as protection for data and other resources. User portal 946 provides access to the cloud computing environment for consumers and system administrators. Service level management 948 provides cloud computing resource allocation and management such that required service levels are met. Service Level Agreement (SLA) planning and fulfillment 950 provide pre-arrangement for, and procurement of, cloud computing resources for which a future requirement is anticipated in accordance with an SLA.

Workloads layer 960 provides examples of functionality for which the cloud computing environment can be utilized. Examples of workloads and functions which can be provided from this layer include: secret management 962; software development and lifecycle management 964; key generation 966; data analytics processing 968; transaction processing 970; and security processing 972.

Figure 10:
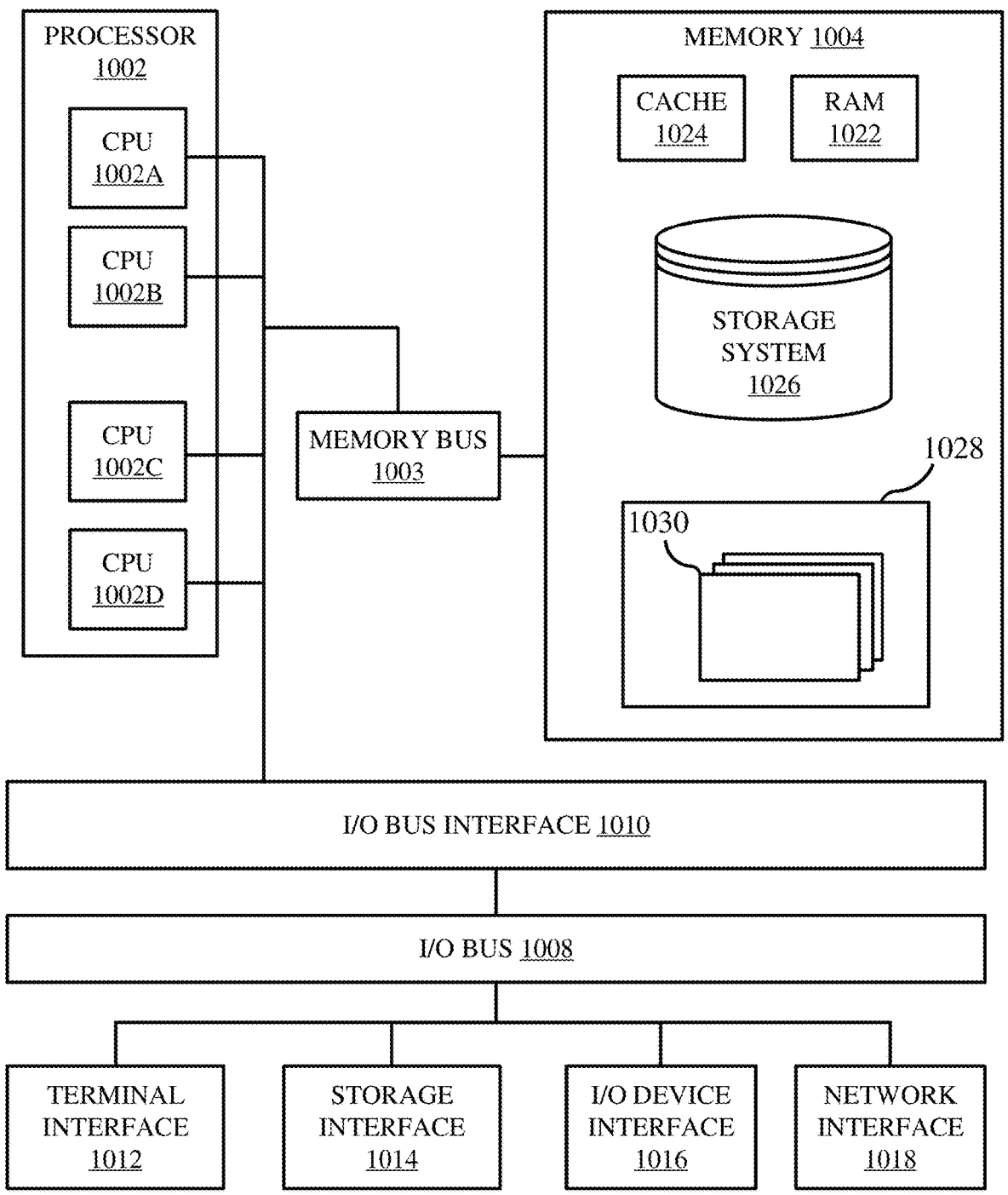
FIG. 10 is a high-level block diagram illustrating an example computer system that can be used in implementing one or more of the methods, tools, and modules, and any related functions, described herein, in accordance with embodiments of the present disclosure.

Referring now to FIG. 10, shown is a high-level block diagram of an example computer system 1001 (e.g., HSM 208, computer system 700, HSM 718) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 1001 can comprise one or more CPUs 1002, a memory subsystem 1004, a terminal interface 1012, a storage interface 1014, an I/O (Input/Output) device interface 1016, and a network interface 1018, all of which can be communicatively coupled, directly or indirectly, for inter-component communication via a memory bus 1003, an I/O bus 1008, and an I/O bus interface unit 1010.

The computer system 1001 can contain one or more general-purpose programmable central processing units (CPUs) 1002A, 1002B, 1002C, and 1002D, herein generically referred to as the CPU 1002. In some embodiments, the computer system 1001 can contain multiple processors typical of a relatively large system; however, in other embodiments the computer system 1001 can alternatively be a single CPU system. Each CPU 1002 can execute instructions stored in the memory subsystem 1004 and can include one or more levels of on-board cache.

System memory 1004 can include computer system readable media in the form of volatile memory, such as random access memory (RAM) 1022 or cache memory 1024. Computer system 1001 can further include other removable/non-removable, volatile/non-volatile computer system storage media. By way of example only, storage system 1026 can be provided for reading from and writing to a non-removable, non-volatile magnetic media, such as a "hard-drive." Although not shown, a magnetic disk drive for reading from and writing to a removable, non-volatile magnetic disk (e.g., a "USB thumb drive" or "floppy disk"), or an optical disk drive for reading from or writing to a removable, non-volatile optical disc such as a CD-ROM, DVD-ROM or other optical media can be provided. In addition, memory 1004 can include flash memory, e.g., a flash memory stick drive or a flash drive. Memory devices can be connected to memory bus 1003 by one or more data media interfaces. The memory 1004 can include at least one program product having a set (e.g., at least one) of program modules that are configured to carry out the functions of various embodiments.

One or more programs/utilities 1028, each having at least one set of program modules 1030 can be stored in memory 1004. The programs/utilities 1028 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 1028 and/or program modules 1030 generally perform the functions or methodologies of various embodiments.

In some embodiments, the program modules 1030 of the computer system 1001 include a HSM binding module. The HSM binding module can be configured to cryptographically link a secret to the software component. The HSM binding module can further be configured to protect the secret linked to the software component such that the secret is only accessible by a trusted firmware. The HSM binding module can further be configured to install the software component in a secure software context. The HSM binding module can be configured to transfer the protected secret to the trusted firmware. The HSM binding module can further be configured to maintain a control block for executing the software component in the secure software context, wherein the control block comprises the secret. The HSM binding module can further be configured to configure the hardware security module such that the hardware security module only responds to requests from a component having access to the secret.

Although the memory bus 1003 is shown in FIG. 10 as a single bus structure providing a direct communication path among the CPUs 1002, the memory subsystem 1004, and the I/O bus interface 1010, the memory bus 1003 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 1010 and the I/O bus 1008 are shown as single respective units, the computer system 1001 can, in some embodiments, contain multiple I/O bus interface units 1010, multiple I/O buses 1008, or both. Further, while multiple I/O interface units are shown, which separate the I/O bus 1008 from various communications paths running to the various I/O devices, in other embodiments some or all of the I/O devices can be connected directly to one or more system I/O buses.

In some embodiments, the computer system 1001 can be a multi-user mainframe computer system, a single-user system, or a server computer or similar device that has little or no direct user interface, but receives requests from other computer systems (clients). Further, in some embodiments, the computer system 1001 can be implemented as a desktop computer, portable computer, laptop or notebook computer, tablet computer, pocket computer, telephone, smart phone, network switches or routers, or any other appropriate type of electronic device.

It is noted that FIG. 10 is intended to depict the representative major components of an exemplary computer system 1001. In some embodiments, however, individual components can have greater or lesser complexity than as represented in FIG. 10, components other than or in addition to those shown in FIG. 10 can be present, and the number, type, and configuration of such components can vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method for binding a hardware security module to a virtual machine, the method comprising:
   cryptographically linking a secret to the virtual machine;
   protecting the secret linked to the virtual machine such that the secret is only accessible by a trusted firmware;
   installing the virtual machine in a secure software context;
   transferring the protected secret to the trusted firmware;
   maintaining a control block by the trusted firmware for executing the virtual machine in the secure software context, wherein the control block comprises the secret;
   configuring the hardware security module by the trusted firmware such that the hardware security module only responds to requests from a component having access to the secret;
   intercepting, by the trusted firmware, respective requests to the hardware security module; and
   re-submitting, by the trusted firmware, an intercepted request from the secure software context to the hardware security module using a protocol requiring that a sender of the intercepted request has access to the secret, wherein the protocol comprises:
      authenticating the opening of the session using the secret;
      re-submitting, to the configured hardware security module, only requests intercepted from the secure software context; and
      closing the session.

2. The method of claim 1, further comprising:
   returning a result of the request by the configured hardware security module to the trusted firmware in response to the request being received using the protocol that requires the sender to have access to the secret.

3. The method of claim 2, further comprising:
   forwarding the result of the request by the trusted firmware to the virtual machine being executed in the secure software context.

4. The method of claim 1, wherein the protocol is a challenge response protocol, wherein each request requests a challenge from the configured hardware security module that can only be solved using the secret.

5. The method according to claim 1, wherein all open sessions on the configured hardware security module are closed if the hardware security module is removed from the virtual machine.

6. The method according to claim 1, wherein the secret is a public/private key pair of which the public key is used for the configuration of the hardware security module.

7. A system for binding a hardware security module to a virtual machine, the system comprising:
   a memory storing program instructions; and
   a processor, wherein the processor is configured to execute the program instructions to perform a method comprising:
      cryptographically linking a secret to the virtual machine;
      protecting the secret linked to the virtual machine such that the secret is only accessible by a trusted firmware;
      installing the virtual machine in a secure software context;
      transferring the protected secret to the trusted firmware;
      maintaining a control block by the trusted firmware for executing the virtual machine in the secure software context, wherein the control block comprises the secret;
      configuring the hardware security module by the trusted firmware such that the hardware security module only responds to requests from a component having access to the secret;

intercepting, by the trusted firmware, respective requests to the hardware security module; and re-submitting, by the trusted firmware, an intercepted request from the secure software context to the hardware security module using a protocol requiring that a sender of the intercepted request has access to the secret, wherein the protocol comprises:

authenticating the opening of the session using the secret;

re-submitting, to the configured hardware security module, only requests intercepted from the secure software context; and closing the session.

8. The system of claim 7, wherein the method further comprises:

returning a result of the request by the configured hardware security module to the trusted firmware in response to the request being received using the protocol that requires the sender to have access to the secret.

9. The system of claim 8 wherein the method further comprises:

forwarding the result of the request by the trusted firmware to the virtual machine being executed in the secure software context.

10. A computer program product comprising a computer readable storage medium having program instructions embodied therewith, the program instructions executable by a processor to cause the processor to perform a method for binding a hardware security module to a virtual machine, the method comprising:

cryptographically linking a secret to the virtual machine;

protecting the secret linked to the virtual machine such that the secret is only accessible by a trusted firmware;

installing the virtual machine in a secure software context;

transferring the protected secret to the trusted firmware;

maintaining a control block by the trusted firmware for executing the virtual machine in the secure software context, wherein the control block comprises the secret;

configuring the hardware security module by the trusted firmware such that the hardware security module only responds to requests from a component having access to the secret;

intercepting, by the trusted firmware, respective requests to the hardware security module; and re-submitting, by the trusted firmware, an intercepted request from the secure software context to the hardware security module using a protocol requiring that a sender of the intercepted request has access to the secret, wherein the protocol comprises:

authenticating the opening of the session using the secret;

re-submitting, to the configured hardware security module, only requests intercepted from the secure software context; and closing the session.

11. The computer program product of claim 10, wherein all open sessions on the configured hardware security module are closed in response to the hardware security module being removed from the virtual machine.

12. The computer program product of claim 10, wherein the secret is a symmetric key which is used for the configuration of the hardware security module.

* * * * *